United States Patent
Low et al.

(10) Patent No.: US 10,730,419 B2
(45) Date of Patent: Aug. 4, 2020

(54) CLIP FOR CAR SEAT COVER

(71) Applicant: CARZAC SDN. BHD., Selangor (MY)

(72) Inventors: Mon Ket Low, Kuala Lumpur (MY); Kok Kwee Haw, Melaka (MY)

(73) Assignee: CARZAC SDN. BHD., Selangor (MY)

( * ) Notice: Subject to any disclaimer, the term of this patent is extended or adjusted under 35 U.S.C. 154(b) by 0 days.

(21) Appl. No.: 16/090,818

(22) PCT Filed: Aug. 30, 2017

(86) PCT No.: PCT/IB2017/055197
§ 371 (c)(1),
(2) Date: Oct. 3, 2018

(87) PCT Pub. No.: WO2018/047039
PCT Pub. Date: Mar. 15, 2018

(65) Prior Publication Data
US 2019/0100123 A1 Apr. 4, 2019

(30) Foreign Application Priority Data
Sep. 9, 2016 (ID) .............................. S00201606086

(51) Int. Cl.
*B60N 2/60* (2006.01)
(52) U.S. Cl.
CPC ........... *B60N 2/6027* (2013.01); *Y10T 24/309* (2015.01)
(58) Field of Classification Search
CPC . Y10T 24/4696; Y10T 24/3459; Y10T 24/42; Y10T 24/309; Y10T 24/44026; Y10T 24/2708; Y10T 24/5825; Y10T 24/5841; Y10T 24/30; Y10T 24/346; Y10T 24/3499; B60N 2/5841; B60N 2/5825; B60N 2/6027; B60N 2205/30; B68G 7/12; F16L 3/13; A47C 31/023
See application file for complete search history.

(56) References Cited

U.S. PATENT DOCUMENTS

| 1,455,754 A | 5/1923 | Trimble |
| 2,639,764 A | 5/1953 | Fernberg |
| 3,140,791 A * | 7/1964 | Hahn ..................... A47B 88/90 217/7 |

(Continued)

FOREIGN PATENT DOCUMENTS

| EP | 0240388 A2 | 10/1987 |
| EP | 1186468 A1 | 3/2002 |

(Continued)

*Primary Examiner* — Robert Sandy
*Assistant Examiner* — Michael S Lee
(74) *Attorney, Agent, or Firm* — Idea Intellectual Limited; Margaret A. Burke; Sam T. Yip

(57) ABSTRACT

The present invention relates to a clip (10) for fastening a car seat cover onto a car seat, characterised by: a head means (11) comprising a U-shaped holder (11a) with a gripping means (11b) at each end to receive and grasp a car seat cover; and an insertion element (13) having a tip end, connected to the head means (11) via a midpoint element (12), to be embedded in the car seat for fastening the car seat cover; characterised in that the midpoint element (12) is a truncated cone connecting the head means (11) with the insertion element (13), wherein the clip (10) is inserted to a joining of the car seat cushion.

4 Claims, 2 Drawing Sheets

(56) References Cited

U.S. PATENT DOCUMENTS

| | | | | |
|---|---|---|---|---|
| 3,473,770 A | * | 10/1969 | Edgerton | B05B 15/622 248/87 |
| 4,566,660 A | * | 1/1986 | Anscher | F16L 3/13 24/453 |
| 4,728,068 A | * | 3/1988 | Rivkin | F16B 21/088 24/297 |
| D379,551 S | * | 5/1997 | Hubbard | D27/183 |
| D799,106 S | * | 10/2017 | Adams, IV | D26/138 |
| 10,091,955 B2 | * | 10/2018 | Crook | A01G 29/00 |
| 2002/0108222 A1 | | 8/2002 | Tillner | |

FOREIGN PATENT DOCUMENTS

| | | |
|---|---|---|
| MY | PI 2014700109 A | 7/2015 |
| WO | 00/71382 A1 | 11/2000 |

\* cited by examiner

CLIP FOR CAR SEAT COVER

BACKGROUND OF THE INVENTION

Field of the Invention

This invention relates to an accessory for automotive, and more particularly to a clip for fastening car seat cover to a car seat.

Description of Related Arts

Car care is important for every car users. Necessary car care does prolong life of the car. Car care not necessary to be exterior but also can be interior of the car such as cleaning, protecting and dressing. Car user should realize the value and importance of protecting their car's interior from the damage inflicted primarily by the sun and dirt brought in from the outside. A good protector can extend the life of car's interior from wear and tear. For instance, the usage of car seat cover is increasing as it can protect leather, vinyl, plastic, glass, carpet and upholstery from fading, brittleness, cracking, peeling and stains. A proper installation of the said car seat cover is necessary to have an optimum protection of car seat.

Conventionally, car seat cover is installed by attaching it to the seat with straps, buckles and S-hooks. A higher cycle of time may require to install the car seat cover by using the said conventional fasteners. These fasteners may also affect the fitment of the car seat cover to the car seat and may cause the cover runs out of shape. Hence, it is necessary to look for a substitution for easy installation of fastener while can fit the car seat cover to a seat without running out of shape.

Malaysia Patent Application No. PI 2014700109 disclosed a fastener for car seat cover. The fastener comprises a pair of arms with a gripping mean at each end, a support surface adjacent to the pair of arms and an insertion element projected from the support plate. A method for installing a car seat cover using the fastener is also provided. However, the fastener has the threaded element on the insertion element. This threaded element may damage the car seat during insertion or long term insertion. Furthermore, the features including the support plate and the insertion element complicate the production of the fastener. Hence, there is a need to have an improvement of car seat cover fastener.

U.S. Pat. No. 1,455,754 disclosed a clip for fastening covers to seat frames and the like comprising a sheet metal member having near its extremities oppositely disposed imperforate offset portions and having a substantially centrally located protuberance, whereby when the ends of the clip are bent toward each other the protuberance formed by one offset portion will register with the recess formed by the other and the centrally located protuberance will extend outwardly from the face of the clip. However, many clips are necessary to be used to fasten the cover to seat frame although said clips are inexpensive sheet metal. Hence, there is a need to have an improvement in reducing the number of fastener use while having long lasting fitment of car seat cover to a seat.

U.S. Pat. No. 2,639,764 disclosed a car seat fabric clip. The clip is useful for securing the fabric covering of an automobile seat to the seat frame. A fastener for securing flexible sheet upholstery material to a rigid rod comprising a one piece relatively thin body of spring metal generally U-shaped in cross section, and a pair of prongs on each arm of the U-shaped body arranged opposite to each other, there being a cut out on opposite side edges of the body shaped to form a pair of prongs. Said body being adapted to be sprung about the rod and the prongs impinge against the rod. However, the U-shaped design of the fastening device with prongs may not user friendly and is time consuming during installation. Hence, there is a need to have a simple and easy installation of clip for fastening car seat cover to a seat.

EP 0240388 A2 disclosed a return means comprises a strip of fabric fixed to a seat cover near one of its edges and integral with a beam along its opposite edge. The beam comprises attachment means distributed along the length of the beam, wherein the attachment means are fixed in an insert formed by a network of threads inserted inside padding of a seat. Said attachment means requires a marine anchor at the end to hook onto the insert. The structure is complex thus complicate the fabrication and installation.

EP 1186468 A1 disclosed a retaining element comprises a fastening leg secured within a cutout of a sheet metal shell of the backrest, a hook portion engaging the upholstery member, a center portion having a cross-shaped cross-section and a receptacle engaging a securing profile of the connector. The retaining element is embedded within the upholstery for holding the upholstery cover via a nonwoven thread, which has to be pre-fabricated for use.

US 2002/108222 A1 disclosed a seat cover device that secures the shaped spar gripped within the gripper jaw assembly to tightly draw the seat cover over the seat body. The installation is performed from the underside of the seat body which is cumbersome and time consuming.

WO 00/71382 A1 disclosed a trim cover attachment system attached to the trim cover, wherein the trim cover attachment comprises a tongue for insertion in the groove and the tongue operable between a closed position during insertion in the groove and an open position after insertion in the groove.

According to existing prior arts, there is a need to have an improved fastener device to attach car seat cover to a seat with simple and easy installation, user friendly and remaining original fabric of the car without damage.

SUMMARY OF INVENTION

It is an objective of the present invention to provide a clip for fastening a car seat cover to a car seat for easy and simple installation.

It is also an objective of the present invention to provide a long lasting car seat cover fitment for a car seat.

It is yet another objective of the present invention to provide a clip for fastening car seat cover to a seat without damaging the original fabric condition.

Accordingly, these objectives may be achieved by following the teachings of the present invention. The present invention relates to a clip for fastening a car seat cover onto a car seat, characterised by: a head means comprising a U-shaped holder with a gripping means at each end to receive and grasp a car seat cover; and an insertion element having a tip end, connected to the head means via a midpoint element, to be embedded in the car seat for fastening the car seat cover; characterised in that the midpoint element is a truncated cone connecting the head means with the insertion element, wherein the clip is inserted to a joining of the car seat cushion.

BRIEF DESCRIPTION OF THE DRAWINGS

The features of the invention will be more readily understood and appreciated from the following detailed descrip

DETAILED DESCRIPTION OF THE INVENTION

Figure 1:
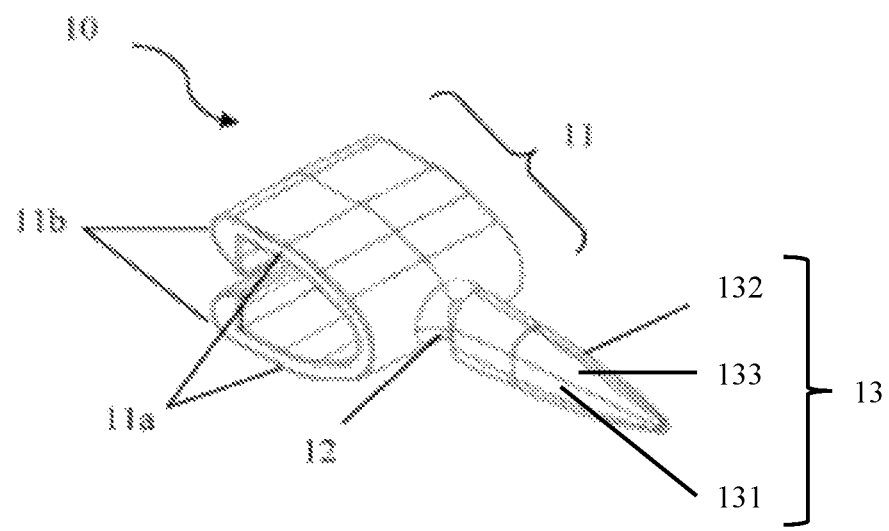
- FIG. 1 shows a perspective view of a clip of the present invention for car seat cover.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. For ease of reference, common reference numerals will be used throughout the figures when referring to the same or similar features common to the figures. The present invention will now be described with reference to FIGS. 1-6.

The present invention relates to a clip (10) for fastening a car seat cover onto a car seat, characterised by:
- a head means (11) comprising a U-shaped holder (11a) with a gripping means (11b) at each end to receive and grasp a car seat cover; and
- an insertion element (13) having a tip end, connected to the head means (11) via a midpoint element (12), to be embedded in the car seat for fastening the car seat cover;
- characterised in that the midpoint element (12) is a truncated cone connecting the head means (11) with the insertion element (13), wherein the clip (10) is inserted to ta joining of the car seat cushion.

As shown in FIGS. 1-4, the insertion element (13) has two opposite flat surfaces (131) and two corresponding ridges (132), and each flat surfaces (131) and each ridge (132) is connected with a shoulder (133). The length of the insertion element (13) approximates the length of the head means (11).

In a preferred embodiment, the gripping means (11b) is extended from each end of the U-shaped holder (11a) and curved inwardly facing each other.

In a preferred embodiment, the upside of gripping means (11b) has a protuberance.

In a preferred embodiment, the gripping means (11b) has a sharp end to grasp the car seat cover tightly to prevent the car seat cover from slipping away from the clip (10).

In a preferred embodiment, the insertion element (13) has a tip end heading downward. The tip end of the insertion element (13) secures the car seat cover onto car seat and locates the car seat cover at a fix position.

In a preferred embodiment, the clip (10) is bendable at the midpoint element (12) to 90° for securing car seat cover onto the car seat; therefore allowing a different angles of insertion of the clip (10) onto the car seat.

In a preferred embodiment, the midpoint element (12) is a truncated cone that connects the head means (11) with the insertion element (13). Any other shapes that ease the bending of the clip (10) may be selected.

In a preferred embodiment, the clip (10) is made of stretchable material such as rubber for flexibility of the clip (10) during placement of the car seat cover into the U-shaped holder (11a) and insertion of the clip (10) onto the car seat.

The clip (10) for car seat cover with the simple design is user friendly and is easy to be installed, hence the installation time for the clip is reduced. The clip (10) provides solid fitment of the car seat cover and said fitment will not be out of shape. These provide benefit of long lasting car seat cover fitment. The simple design of the clip (10) remains original fabric of the car without damage as the clip (10) is inserted to the joining of the car seat cushion with the insertion element (13) embedded in the car seat while the head means (11) remain above the car seat for grasping the car seat cover. The joining referred herein is the stitching line where two fabrics of the car seat cushion are sewed together.

Figure 3:
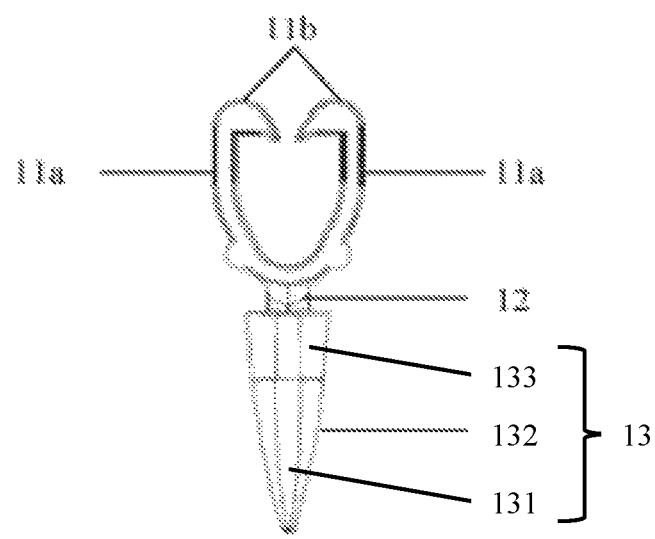
FIG. 3 shows a front view of the clip in FIG. 1.
Figure 4:
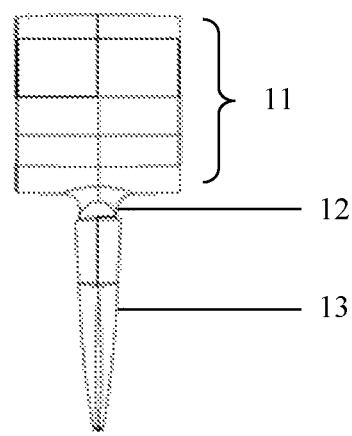
FIG. 4 shows a side view of the clip in FIG. 1.

As seen in FIGS. 3-4, the midpoint element (12) of the clip (10) is shorter in width than the insertion element (13); as such, when the clip (10) is inserted to the joining of the car seat cushion, the insertion element (13) having a tip end heading downward can easily penetrate in and rested at the midpoint element (12), thereby ensuring fitment of the clip (10) to the car seat cushion and grasp the car seat cover tightly.

Below is an example of a clip (10) for car seat cover from which the advantages of the present invention may be more readily understood. It is to be understood that the following example is for illustrative purpose only and should not be construed to limit the present invention in any way.

EXAMPLE

A clip (10) for car seat cover was developed and shown in the FIGS. 1-6. Referring to FIGS. 1-6, the clip (10) for the car seat cover comprises a head means (11), a midpoint element (12) and an insertion element (13). The head means (11) comprises a gripping means (11b) curves inwardly facing each other for the purpose of receiving and grasping a strip of the car seat cover. The midpoint element (12) connects the head means (11) with insertion element (13) to form the clip (10) for fastening a car seat cover onto a car seat. The insertion element (13) which connected to the midpoint element (12) has a tip end heading downward. The tip end of the insertion element (13) secures the car seat cover onto the car seat.

Figure 2:
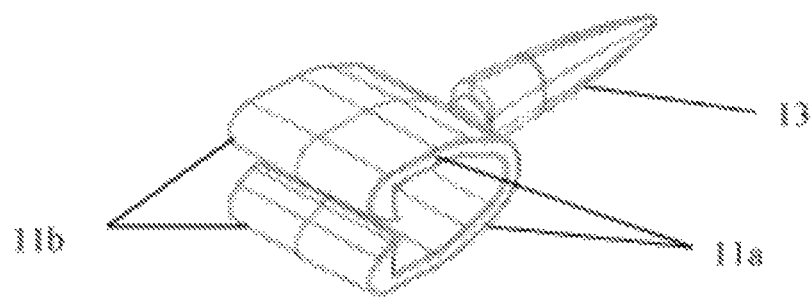
FIG. 2 shows another perspective view of the clip in FIG. 1.
Figure 5:
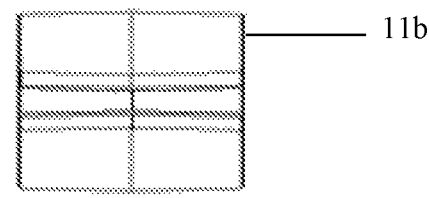
FIG. 5 shows a top view of the clip in FIG. 1.
Figure 6:
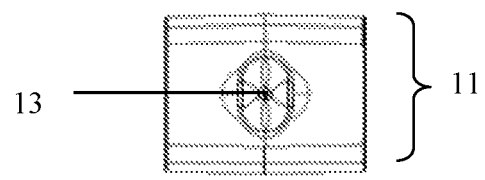
FIG. 6 shows a bottom view of the clip in FIG. 1.

The FIG. 1 showed overview of the clip (10) which comprises the head means (11), the midpoint element (12) and the insertion element (13). The FIG. 2 showed another perspective view of the clip (10) by showing the inward curve of the gripping means (11b), FIG. 3 showed front view of the clip (10), FIG. 4 showed the side view of the clip (10), FIG. 5 showed the top view of the clip (10) and FIG. 6 showed the bottom view of the clip (10).

The method of installing the clip (10) for car seat cover onto car seat comprises the steps of: inserting the clip (10) to the joining in between the car seat cushion of the backrest or bottom seat; turning the clip (10) to 90 degree to hock the clip (10) tightly to the seat; gripping felt strip of the car seat cover via the U-shaped holder (11*a*) to complete the installation.

Although the present invention has been described with reference to specific embodiments, also shown in the appended figures, it will be apparent for those skilled in the art that many variations and modifications can be done within the scope of the invention as described in the specification and defined in the following claims.

DESCRIPTION OF THE REFERENCE NUMERALS USED IN THE ACCOMPANYING DRAWINGS ACCORDING TO THE PRESENT INVENTION

| Reference Numerals | Description |
| --- | --- |
| 10 | Clip |
| 11 | Head means |
| 11a | U-shaped holder |
| 11b | Gripping means |
| 12 | Midpoint element |
| 13 | Insertion element |

We claim:

1. A clip (10) for fastening a car seat cover onto a car seat, the clip (10) comprising:
    a head means (11) comprising a U-shaped holder (11*a*) with a gripping means (11*b*) at each end, the gripping means (11*b*) including a sharp end configured to receive and grasp a car seat cover; and
    an insertion element (13) having a tip end, connected to the head means (11) via a midpoint element (12), to be embedded in the car seat for fastening the car seat cover;
    characterised in that the midpoint element (12) is a truncated cone connecting the head means (11) with the insertion element (13), wherein the clip (10) is inserted to a joining of the car seat cushion;
    wherein the insertion element (13) comprising two opposite flat surfaces (131) and two corresponding ridges (132); and
    wherein each flat surface (131) and each ridge (132) are connected with a shoulder (133); and
    wherein the clip (10) is made of stretchable material such that the midpoint element (12) is bendable.

2. The clip (10) as claimed in claim 1, wherein the clip (10) is made of stretchable material.

3. The clip (10) as claimed in claim 2, wherein the stretchable material is rubber.

4. The clip (10) as claimed in claim 1, wherein the insertion element (13) has a tip end heading downward.

\* \* \* \* \*